Nov. 17, 1959　　　M. PFEIFFER　　　2,913,242
CARD FEEDING DEVICES FOR RECORD CARD MACHINES
Filed Feb. 7, 1956　　　　　　　　　　　5 Sheets-Sheet 2

Inventor:
Max Pfeiffer

Nov. 17, 1959   M. PFEIFFER   2,913,242
CARD FEEDING DEVICES FOR RECORD CARD MACHINES
Filed Feb. 7, 1956   5 Sheets-Sheet 3

Inventor:
Max Pfeiffer
By Michael S. Striker
agt.

Nov. 17, 1959 M. PFEIFFER 2,913,242
CARD FEEDING DEVICES FOR RECORD CARD MACHINES
Filed Feb. 7, 1956 5 Sheets-Sheet 4

Inventor:
Max Pfeiffer

Nov. 17, 1959  M. PFEIFFER  2,913,242
CARD FEEDING DEVICES FOR RECORD CARD MACHINES
Filed Feb. 7, 1956  5 Sheets-Sheet 5
Fig. 10
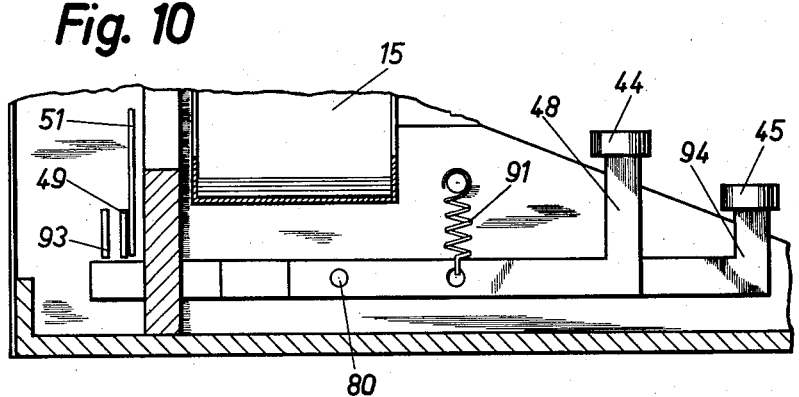
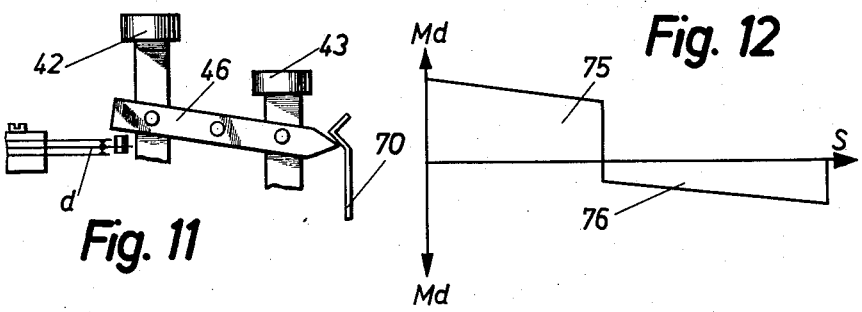
Fig. 11
Fig. 12
Fig. 13
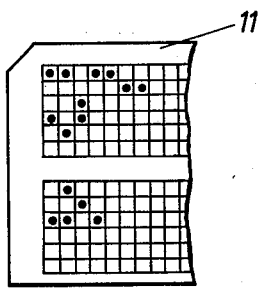
Fig. 14
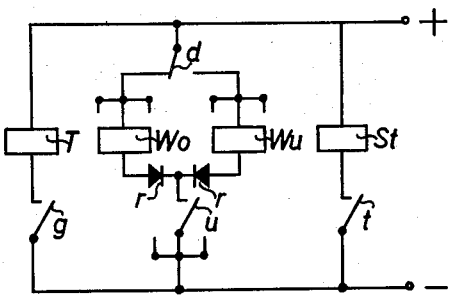
Inventor:
Max Pfeiffer
By Michael S. Striker
ag8.

United States Patent Office 2,913,242
Patented Nov. 17, 1959

2,913,242

CARD FEEDING DEVICES FOR RECORD CARD MACHINES

Max Pfeiffer, Nurnberg, Germany, assignor to Michael Maul, Schwabach, Germany

Application February 7, 1956, Serial No. 563,983

Claims priority, application Germany February 17, 1955

5 Claims. (Cl. 271—54)

In record card machines, such as in punching machines for perforated record cards or in card verifying machines there are known feeding devices for feeding the cards, which devices feed the cards card field by card field by means of a card carriage to a punching or analyzing device. In punching machines the card movement is for instance effected past the punches and in card verifying machines past the analyzing means analyzing the holes for the purpose of verification.

In simpler machines of this type it is customary to manually insert the card in the machine at the terminal position of the card support and to shift the card by means of the card support from the terminal position to the start position for perforating or verifying. In connection with the column by column perforation or verification the stepwise feed of the card is then effected from the starting position to the terminal position of the card support.

In order to increase the efficiency it is, however, also known to provide in machines of the before mentioned type a supply magazine for the cards to be fed to the machine and to remove the cards one after the other from the supply magazine and to shift them by means of the card card field by card field from the starting position to the terminal position. Usually a field is constituted by a column of the card and the card is shifted column by column and step by step so that the punching device—or analyzing device—sucessively cooperates with the card columns. In the known devices the card removal from the card supply magazine is effected by a separate card supply mechanism, in most instances by a separate supply support which is operatively connected to the card support proper for the step-by-step-feeding of the card in such a manner that both supports exercise an opposite movement. Consequently, upon back movement of the card support from its terminal position to the start position the supply support feeds another card to the card support.

All machines according to the known art have positioning means for holding the card during punching or analyzing operations, and in addition thereto separate means for picking a card from the stack and for transferring the card to the card carriage.

It is the object of the present invention to provide a machine in which no additional picking means are required for transferring cards.

Another object of the present invention is to provide gripper means for holding the lowermost card of a stack during movement of the carriage.

With these objects in view the present invention mainly consists in the combination of a magazine for holding a stack of record cards; a card bed; a card carriage movable along the card bed from a first position spaced from the magazine to a second position located underneath the magazine, and back to the first position; card positioning means mounted on the carriage for movement therewith and including a card knife for engaging the edge of the lowermost card of the stack of cards during movement of the carriage from the first position to the second position to displace the lowermost card from the stock, and gripping means for gripping the opposite edge of the thus displaced lowermost card; spring means urging the gripping means into a gripping position; a stationary stop on the card bed engaging the gripping means during movement of the carriage to the second position and actuating the gripping means to move to an open position against the action of the spring means for receiving the opposite edge of the displaced card, the stop means releasing the gripping means during movement of the carriage from the second position toward the first position so that the gripping means move to the gripping position and grip the displaced lowermost card; and means for moving the carriage from the first position to the second position and again back to the first position whereby the card gripped by the gripping means moves with the carriage to the first position.

According to the present invention an essential simplification in supplying the card from the supply magazine to the card carriage is obtained in that upon its back movement from the terminal position to the start position the card carriage is returned beyond the start position and thereupon engages the lowermost card of the supply magazine by means of a card gripper device provided on the card carriage, that, however, subsequently the card carriage again returns automatically to the start position. By these means a separate supply mechanism for the cards need not be provided and the device provided on the card carriage for the automatic advance of the next card is extraordiarily simplified.

In a particularly preferred embodiment, upon return of the card support beyond its start position a card knife moves the lowermost card out of the supply magazine opposite to the stepwise feeding direction of the card and the flying end of the card is engaged by a gripper provided on the end of the carriage which then feeds the card under the stack of cards up to the start position, when the card carriage returns for the way which it performed beyond the start position.

A preferred embodiment of the invention is illustrated in the accompanying drawings. In this instance it has been assumed that a perforating machine for hole combinations is concerned adapted to punch double deck cards. By means of translator bars in a known manner each key actuation is translated into a combination of controlling impulses for punch selector magnets, which in turn move bars between the punching yoke and the punches which latter are depressed by the punching yoke. A machine of this type is for instance known from the U.S. Patent 2,210,552, therefore in the following specification known details will not be further referred to.

Fig. 10 shows the arrangement of the controlling keys according to the sectional line 10—10 of Fig. 9.

Fig. 11 shows the arrangement of the deck shifting key according to sectional line 11—11 of Fig. 9.

Fig. 12 shows the spring diagram of the support feed springs.

Fig. 13 shows the portion of a card as used in the illustrated machine.

Fig. 14 shows the wiring diagram of the machine.

Figure 1:
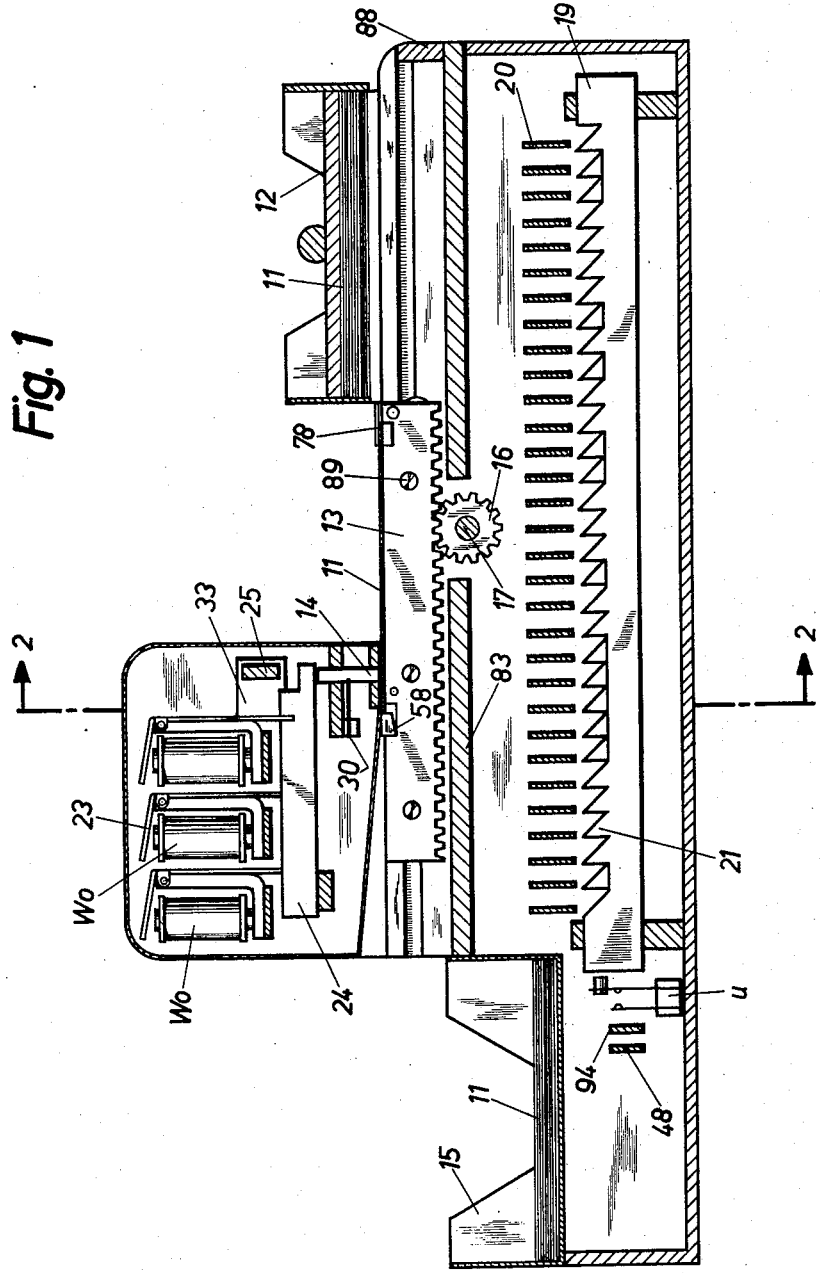
Fig. 1 shows a longitudinal section through the machine according to line 1—1 of Fig. 2.

Before referring to details the operation of the machine shall be briefly described:

In the machine cards having two decks are punched. A portion of a card used in the machine is shown in Fig. 13. Each perforation column comprises six hole positions. The two decks are fed in two runs column-by-column from the right to the left (Fig. 1) past the punches and are then punched. Normally at first the upper deck is punched, subsequently the card is returned to the right and then the lower deck is punched. The perforation is effected in hole combinations for numerals and characters. At the beginning of the operation the cards 11 (Fig. 1) are deposited into the magazine 12 and after punching they are deposited by the machine in the pocket 15. The stepwise feeding of the card past the punches as well as the movement of a card from the magazine to a start position is effected by the card support or carriage 13. At the beginning of the operation, the support is in the left terminal position (Fig. 1). In this position the last column of a completely punched card is under the punches.

By depression of the carriage return key the carriage movement to the right is released so that the latter may run under the supply magazine 12 to a card removing position and will draw another card therefrom. The previously punched card, however, is retained in the left terminal position and cannot follow the return movement of the card support. Immediately after this operation, when the card carriage has removed a card from the supply magazine 12, it slides to the left into the start position for punching. In this position the first column of the punched card is one step ahead of the punches.

Upon depression of the character keys now the card support is shifted together with the card past the punches, at first the step under the punches being effected and subsequently the perforation corresponding to the depressed character key. During this step by step shifting the card support pushes forward the previously punched card into the card receiver 15. The upper deck having been completely punched, the card is to be returned to the start position for punching in order to permit perforation of the lower deck. For this purpose a second return key is depressed controlling the machine in such a manner that the card is not arrested but is moved to the right by the card support. Upon depression of this second return key the card carriage 13 may run only to the right start position, but not to the card removing position under the supply magazine 12 for drawing another card. The card having arrived in its start position, is again fed to the left step by step past the punches for the perforation of the lower deck by key controlled means.

After the perforation of the card has been completed, again the other return key is depressed which controls the card change. Simultaneously with the depression of the corresponding return key also the corresponding deck selection key is depressed setting the machine for perforation of a certain deck.

In detail the above mentioned embodiment is constructed as follows:

The drive for the card support is effected through the toothed wheel 16 seated on the shaft 17 by a step by step shifting mechanism which will be described further below.

Figure 2:
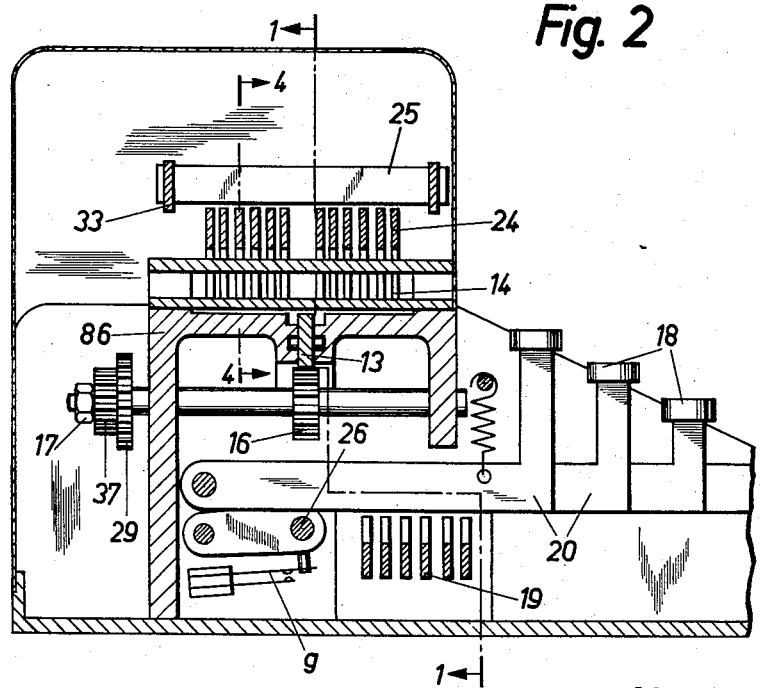
Fig. 2 shows a cross section through the machine according to line 2—2 of Fig. 1.

Punching as well as step by step shifting of the card support 13 is key controlled by depression of a character key 18 (Fig. 2). By the depression of a character key 18 the associated key lever 20 is urged in a known manner towards the inclination of teeth 21 pertaining to the translator bars 19 (Figs. 1 and 2) and the selected bars are moved to the left. Teeth are provided in a known manner on the translator bars 19, corresponding to the hole combinations of the applied key. The displaced translator bars act upon their associated contacts $u$ which close the current circuits to the selector magnets W$o$ and W$u$ respectively (Fig. 14). In this instance, the selector magnets W$o$ serve for the upper deck and the selector magnets W$u$ for the lower deck. Deck selection takes place by the shift contact $d$ (Figs. 11 and 14), upon which act the deck selection keys 42 and 43 which will be again referred to later on.

In the further specification it shall be assumed that the upper deck is selected for perforation and that consequently upon closure of the contacts $u$ the associated selector magnets W$o$ are energized. The selector magnets W$o$ attract their armatures 23 which are rocked in counterclockwise direction (Fig. 1). Thus the lower ends of the armatures displace the translator bars 24 to the right (Fig. 1) so that the full depth of the selector bars arrives between the punching yoke 25 and the punches.

By depressing of the key 18, also by means of the key lever 20 a common bar 26 (Fig. 2) is urged downwardly which common bar in turn acts upon a contact $g$. The contact $g$ closes the current circuit to the feed magnet T (Fig. 14) which is energized and attracts the lever 27 (Fig. 3) on which is mounted the pawl 28 tending to move to the left under spring action. The pawl 28 engages the teeth of the ratchet pawl 29 and rotates the latter in clockwise direction until the pawl 28 engages the stop 32. During this rotative movement the detent pawl engages behind the next tooth.

Figure 3:
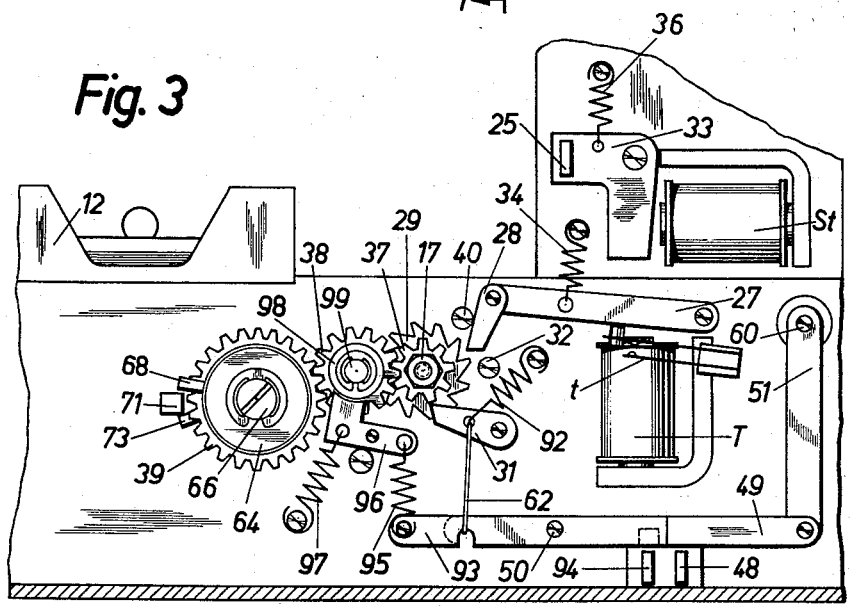
Fig. 3 shows a portion of the rear view of the machine together with the drive for the card carriage.

The lever 27 acts also upon the contact $t$ which closes the current circuit to the punching yoke S$t$ (Fig. 14). The punching magnet attracts the lever 33 and rocks the latter in counter-clockwise direction (Fig. 3). On the lever 33 is fastened the punching yoke 25 which due to its rocking movement directed downwardly engages the displaced selector bars 24 (Fig. 1) and through the latter presses on the associated punches 14.

When the character key is released the translator bars 19 as well as the common bar 26 return to their start position and the contacts $u$ and $g$ open the current circuits to the selector magnets W$o$ and to the feed magnet T. The armatures of the energized selector magnets W$o$ are deenergized and the selector bars 24 are returned to their start position by springs not illustrated. The lever 27 (Fig. 3) and therewith the pawl 28 are drawn upwardly by the spring 34, so that the pawl 28 becomes disengaged from the teeth of the ratchet wheel 29 by the stop 40. Due to the clockwise rocking movement of the lever 27 also the contact $t$ opens, thus interrupting the current circuit to the punching magnet S$t$ so that the armature 33 is deenergized and is rocked in clockwise direction by the spring 36. Thus the punching yoke 25 assumes again its start position. By means of the leaf springs 30 (Fig. 1) the punches 14 are removed from the card.

Simultaneously with the step by step displacement of the carriage by means of the ratchet wheel 29 the spiral spring 41 (Figs. 7 and 8) is tensioned through the gear 37, the gear 38 and the gear 39. The cooperation of the spring 41 and the step by step shifting will be described in detail later on.

The perforation of the upper deck of the card being completed, the carriage together with the card may be returned to the start position for punching of the lower deck. Instead of returning the card to the start position it is also possible to guide the card immediately after punching of one deck to the card receiver without punching the other deck.

Figure 9:
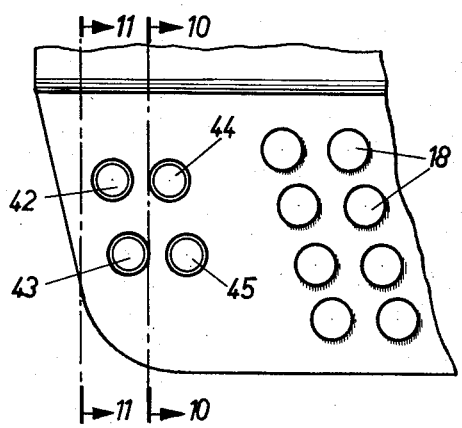
Fig. 9 shows a portion of the key board of the machine.

Normally the operation will be such, that after removal of the card from the supply magazine the upper deck is punched, subsequently the card is returned to the start position and that then the lower deck is punched. After perforation of the lower deck deposition of the card into the receiver 15 takes place. In accordance with this manner of operation the controlling keys for the return movement of the card support are arranged in a way avoiding as far as possible mistakes in the operation by the operator. The arrangement of the controlling keys may be seen from Fig. 9. By depression of the key 42 the upper deck is selected for perforation and by depression of the key 43 the lower deck is selected, as already mentioned above. Adjacent to the key 42 the key 44 is arranged which controls the card feed in such a manner that the card just perforated is further fed to the card receiver 15 and the card carriage removes another card from the supply magazine 12. Adjacent to the key 43 for the lower deck is arranged the key 45 which controls the card feed in such a way that the card just punched is again returned to the start position for punching and that now the blank lower deck of the same card may be punched. Upon depression of the key 42 for the upper deck, therefore, the key 44 for the card change may be depressed at the same time, while upon depressing of the key 43 for the lower deck the key 45 for returning of the card just punched may be simultaneously actuated.

The two deck keys 42 and 43 are in such an operative connection, that only one of the two decks may be selected. The two deck keys 42 and 43 (Fig. 11) are linked to a lever 46 permitting only depression of the key 42 or depression of the key 43 at a time. The right hand end of the lever 46 acts upon a detent spring 70 and therewith arrests the deck keys in the respective selected position. The left hand end of the lever 46 acts upon the shift contact d which closes the current circuit either to the selector magnet Wo or to Wu as has already been described.

Figure 4:
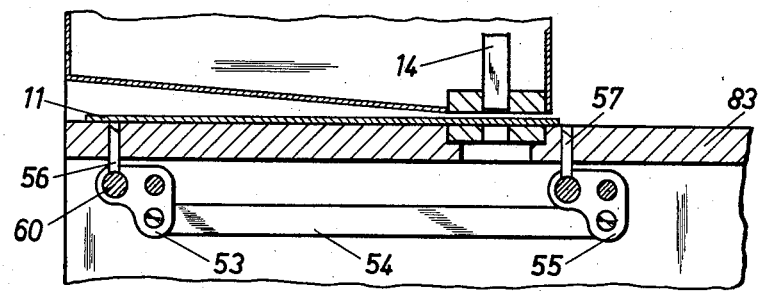
Fig. 4 shows part of a longitudinal section through the machine from which section particularly the retaining device for depositing the cards may be seen.

As described above, the key 44 is to be depressed to deposit the card just punched and to move another card to the start position. By depression of the key 44 the associated lever 48 (Fig. 10) is rocked in clockwise direction about the pivot 80. The left hand end of the lever 48 acts upon the lever 49, however, no longer upon lever 93, and rocks the lever 49 in counter-clockwise direction about its pivot 50 (Fig. 3). By pin 60 the lever 53 (Fig. 4) is linked to the right hand end of the lever 49 through link 51, so that the lever 53 may be rocked in clockwise direction in which instance pin 60 will also move upwardly (Figs. 3 and 4). By means of the link 54 the bell crank lever 55 is connected to the bell crank lever 53 and is consequently rocked in clockwise direction. By rocking of the lever 53 the pin 56 and by rocking of the bell crank lever 55, pin 57 is moved upwardly. The pin 56 lifts the card 11, so that the latter becomes disengaged from the holding knife 58 of the card support 13. The pin 57 prevents movement of the card 11 to the right (Fig. 4) so that the latter is drawn from the gripper 78 and held in the predetermined position upon return movement of the card carriage 13.

On the left hand end of the lever 49 (Fig. 3) rocking in counter-clockwise direction, upon depression of the key 44, there is latched a key controlled bar 62 which draws the pawl 31 from the teeth of the ratchet wheel 29 and thereby releases the locking of the card support. By means of the tensioned support spring 41 the card carriage 13 is then moved to the right (Fig. 1) through gears 39, 38, 37, the shaft 17 and the gear 16. The spring 41 acts upon the card carriage long enough until the latter has reached the start position. The operation of the spring will be referred to again later on. When the card carriage has reached the start position, a certain amount of kinetic energy has been imparted which causes the card carriage to run beyond this position under the supply magazine 12. The card carriage is locked by a spring 63 (Fig. 8) through the gears 16, 37, 38 and 39, however, in such a way that it is still permitted to run completely under the supply magazine and to grip another card.

Figure 7:
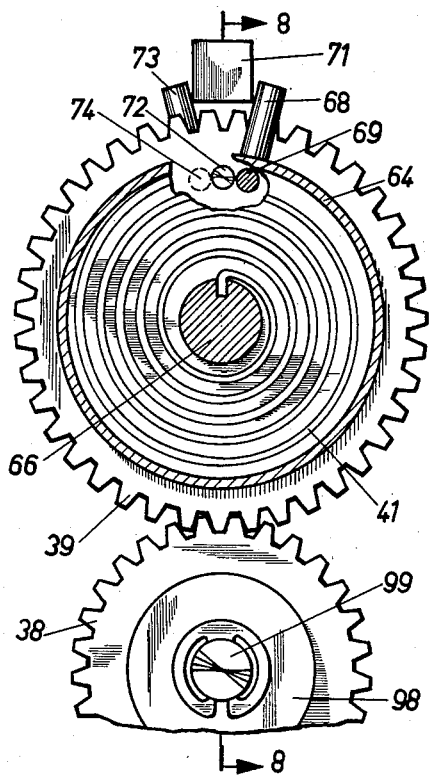
Fig. 7 shows the arrangement of the springs for the card support according to the sectional line 7—7 of Fig. 8.
Figure 8:
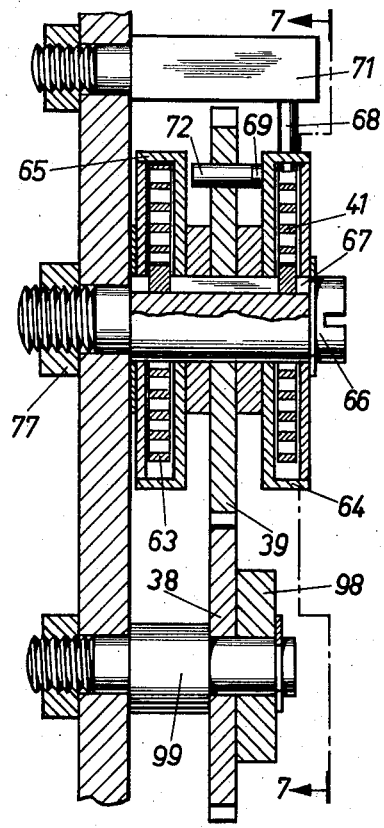
Fig. 8 shows the section through the support feed springs according to line 8—8 of Fig. 7.

The two springs 41 and 63 are comprised in a constructional unit in order to permit an easy balancing of the two springs with regard to each other. The spring 41 is provided in the spring casing 64 and the spring 63 in a casing 65 (Figs. 7 and 8). Each of the two spring casings 64 and 65, as well as the gear 39 is rotatably mounted on the bolt 66. There is a slot 67 in the bolt 66 to which slot the springs 41 and 63 are latched. In this instance the spring 41 is tensioned in clockwise direction and the spring 64 in counter-clockwise direction (Fig. 7). On the spring casing 64 there are provided the two pins 68 and 69. The pin 68 is urged by the spring 41 against the stop 71 fast to the machine frame thus permitting release only to a certain degree. The pin 69 acts upon the pin 72 fast to the gear 39. If the gear 39 is rotated in clockwise direction it takes with it the spring casing 64 through the pins 72 and 69 and the spring 41 is thereby tensioned.

The spring casing 65 is provided with the pins 73 and 74. The pin 73 acts also upon the stop 71 and the pin 74 upon the pin 72 of the gear 39. If the gear 39 is rotated in counter-clockwise direction it takes with it the spring casing 64 through the pins 72 and 74 and thereby tensions the spring 63.

If upon punching the card carriage 13 is fed step by step to the left (Fig. 1), the gear 39 is rotated in clockwise direction (Fig. 7) through the gears 16, the shaft 17 and the gears 37 and 38, and therewith the spring 41 is tensioned, as has already been mentioned above. Punching of the card having been completed, the release key 44 is depressed, thereby for release of the ratchet wheel 29, the spring 41 is released and the gear 39 rotates in counter-clockwise direction. At the same time the card carriage 13 moves to the right (Fig. 1). The spring 41 relaxes only so far until the pin 68 engages the stop 71 (Fig. 7). At this moment the card carriage 13 has reached the start position for punching. The energy of the carriage 13 and of the gears operatively connected therewith up to the gear 39, however, tend, due to the kinetic energy stored in the same, to rotate further on the gear 39 in counter-clockwise direction. The pin 72 on the gear 39 engages the pin 74 of the spring casing 65 and starts rotating the latter also in counter-clockwise direction so that the spring 63 is tensioned. Consequently, the spring 63 picks up the kinetic energy and transforms the latter again into potential energy. The spring 41 and the spring 63 are so dimensioned with regard to each other, that the braking way of the spring 63 is sufficient to permit running of the card support 13 below the supply magazine 12 in order to draw another card from the supply magazine.

The diagrams of the two springs with relation to the travel of the card support are shown in Fig. 12. In the left hand position of the card carriage the spring 41 is tensioned. The potential energy available for the spring 41 follows from the area 75 of the diagram. If the card carriage is released, this potential energy is transformed into kinetic energy reduced by the frictional loss of energy, the kinetic energy is again stored by the spring 63 and is transformed into potential energy. This potential energy follows from the area 76 of the diagram in Fig. 12. In order to obtain travelling of the card support for a distance necessary for the removal of the card, the area 75 minus frictional loss of energy must be equal to the area 76. The pre-tension of the two springs as well as braking of the run of the card carriage due to friction must be so proportioned with regard to each other, that the carriage will readily return from the removing position to the start position for punching without the occurrence of interrupting collisions.

For this reason the proper adjustment of the two springs with regard to each other must be easily settable. Such adjustment is effected by loosening of the nut 77 (Fig. 8) and turning of the bolt 66. If the bolt 66 is rotated in counter-clockwise direction (Fig. 7), the spring 41 is tensioned and the spring 63 relaxes. This is necessary if the braking way of the card carriage is too short to permit gripping of another card from the supply magazine 12. If the bolt 66 is rotated in clockwise direction the spring 41 relaxes and the spring 63 is tensioned. This is necessary if the braking way of the card carriage is too long and if collisions occur in the start positions.

Figure 5:
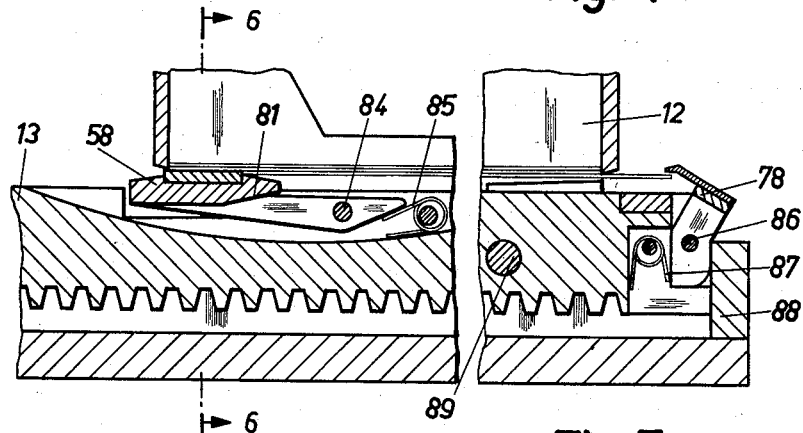
Fig. 5 shows part of a longitudinal section through the machine according to the sectional line 5—5 of Fig. 6, from which particularly the device for removing the cards from the supply magazine may be seen.
Figure 6:
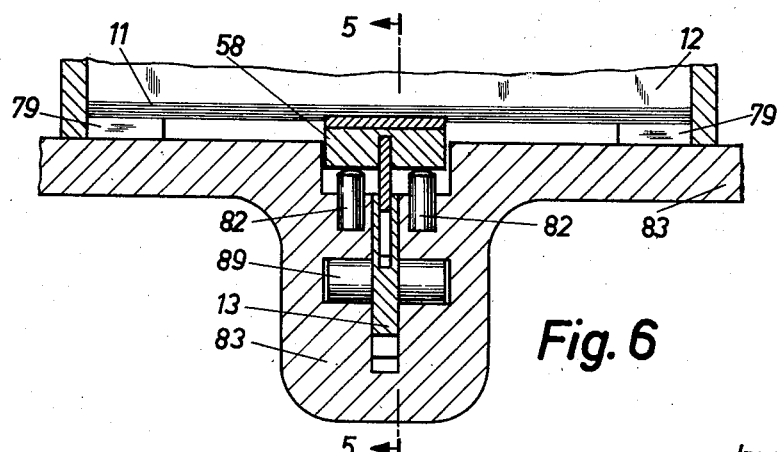
Fig. 6 shows a cross section through the machine according to the sectional line 6—6 of Fig. 5.

The card is engaged by the knife 58 and the gripper 78 of the card carriage 13. The gripper 78 runs past the cards 11 being in the supply magazine 12 in order to permit engaging of the right hand end of the lowermost card (Fig. 5). For this reason the cards 11 rest upon the bars 79 in the supply magazine 12 (Fig. 6) somewhat above the card bed 83. If the card carriage arrives in the right hand terminal position (Fig. 5) below the supply magazine 12 the inclination 81 of the card knife 58 runs upon the pins 82 in the bed 83 (Fig. 6). The knife 58 is rotatably mounted on the pin 84 and is rocked against the spring action 85 in clockwise direction for such an extent that upon running to the right of the card carriage the knife engages the lowermost card in the supply magazine 12 and moves the latter card to the right (Fig. 5). At the right hand end of the carriage there is provided the gripper 78 which is mounted on the pin 86 and the upper end of which gripper is urged against the card carriage by means of spring 87. When the card carriage has reached its right hand terminal position, the lowermost end of the gripper engages the stationary stop 88 and the gripper 78 rocks in clockwise direction so that its upper end is lifted from the card carriage. Thus an opening will be provided between the gripper and the card carriage in which the card is moved from the supply magazine by the knife 58. Immediately after this operation the card carriage 13 is again moved to the left (Figs. 1 and 5) to the start position for punching. Upon movement to the left the upper end of the gripper 78 is again rocked towards the card carriage 13 by means of spring 87 and engages the card which is somewhat bent through in the middle section and in this position is moved from the supply magazine to the start position for punching. Guiding of the card carriage 13 in the bed 83 is effected by the pins 89.

When the next card has reached the start position and the key 44 is released the latter is drawn to its initial position by the spring 91 (Fig. 10). The spring 92 (Fig. 3) draws the detent pawl 31 into the teeth of the ratchet wheel 29 and herewith prevents a return movement of the ratchet wheel in the step by step shifting now following. The lever 49 is rocked in clockwise direction through the bar 62 and the bell crank levers 53 and 55 are rocked in counter-clockwise direction through the links 51 and 54 (Fig. 4) so that the pins 56 and 57 are lowered into the card path. Simultaneously with the subsequent perforation of the next card, the card knife 58 (Fig. 1) pushes the previously punched card to the card receiver 15.

If upon card change the card is to be fed back to the start position for punching the key 45 (Fig. 10) is, as already mentioned above, depressed. By depression of the key 45 the lever 94 is rocked in clockwise direction (Fig. 3). The lever 94 acts upon the lever 93 (Fig. 3) rockable around the bolt 50 and rocks said lever in counter-clockwise direction. The lower end of the bar 62 is now not only latched—as already mentioned—to the lever 49 but comprises also the left hand end of the lever 93. Consequently, the lever 93 draws through the bar 62, the detent pawl 31 from the teeth of the ratchet wheel 29 thus releasing the movement of the card carriage to the right (Fig. 1), in case the key 45 should be depressed. Further on, the lever 93 rocks through spring 95 the braking lever 96 in clockwise direction against the spring 97 and the left hand end (Fig. 3) of the braking lever 96 presses against the braking disk 98. The spring 95 is so dimensioned with regard to spring 97 that a certain braking power of the braking lever acts upon the braking disk 98. The braking disk 98 is firmly connected to the idler gear 38 which is mounted on the bolt 99. By friction of the braking lever 96 the major part of the potential energy of the spring 41 is eliminated so that the energy of the card support does not suffice to draw another card from the supply magazine. The adjustment of the braking power is effected by corresponding tensioning of the spring 97. The braking power results from the difference between the actions of the two springs 95 and 97. When the card carriage has reached the start position for punching and when the operator releases the key 45, the spring 97 draws the braking lever 96 to the start position and the spring 92 draws the detent pawl again to locking position. Subsequently, punching of the second deck will take place.

The rectifiers r in the wiring diagram (Fig. 14) serve the purpose of avoiding back-currents which may lead to a wrong setting of the selector magnets Wo or Wu and consequently may cause an erroneous perforation.

I claim:

1. In a key operated machine, in combination, a supply magazine for holding a stack of record cards; a card bed; a card carriage movable along said card bed from a start position to a terminal position, and being movable from said terminal position to a card removing position located adjacent said supply magazine beyond said start position, and back to said start position; a card knife on said carriage for engaging the outermost card of the stack of cards in said supply magazine during movement of said carriage from said start position to said card removing position so that said outermost card is displaced from the stack and moves with said carriage to said card removing position; gripper means on said card carriage for gripping the outermost card of the stack of cards in said supply magazine in said card removing position of said carriage; stationary stop means for actuating said gripper means in said card removing position of said carriage; first key controlled means for moving said carriage from said start position to said terminal position for feeding a card field by field along said card bed; a device for successively cooperating with said fields of the card held by said gripper means during movement of said carriage from said start position to said terminal position; second key controlled means for returning said carriage from said terminal position to said card removing position and from there automatically again to said start position so that the card gripped by said gripper means, is automatically moved with said carriage to said start position for being fed to said device under the control of said first key controlled means.

2. In a machine of the type described, in combination, a magazine for holding a stack of record cards; a card bed; a card carriage movable along said card bed from a first position spaced from said magazine to a second position located underneath said magazine, and back to said first position; card positioning means mounted on said carriage for movement therewith and including a card knife for engaging the edge of the lowermost card of the stack of cards during movement of said carriage from said first position to said second position to displace said lowermost card from said stack, and gripping means for gripping the opposite edge of the thus displaced lowermost card; spring means urging said gripping means into a gripping position; a stationary stop on said card bed engaging said gripping means during movement of said carriage to said second position and actuating said gripping means to move to an open position against the action of said spring means for receiving the opposite edge of the displaced card, said stop means releasing said gripping means during movement of said carriage from said second position toward said first position so that said gripping means move to said gripping position and grip said displaced lowermost card; and means for moving said carriage from said first position to said second position and again back to said first position whereby the card gripped by said gripping means moves with said carriage to said first position.

3. In a machine of the type described, in combination, a magazine including two spaced support members for supporting a stack of cards; a card bed; a card carriage movable along said card bed in a substantially horizontal direction from a first position spaced from said magazine to a second position located below said magazine, and back to said first position; a card knife mounted on said carriage for movement between a lower position and a raised position projecting in said raised position above said spaced support members, said card knife passing between said spaced support members during movement of said carriage to and from said second position; means on said card bed engaging said card knife during movement of said carriage toward said second position for raising said card knife from said lower position to said raised position so that said card knife engages the edge of the lowermost card of the stack of cards and displaces said lowermost card from said stack during movement to said second position; gripping means for gripping the thus displaced card; means for moving said card knife back to said lower position during movement of said carriage from said second position to said first position; and means for moving said carriage from said first position to said second position and again back to said first position whereby the card gripped by said gripping means moves with said carriage to said first position.

4. In a machine of the type described, in combination, a magazine including two spaced support members for supporting a stack of cards; a card bed; a card carriage movable along said card bed in a substantially horizontal direction from a first position spaced from said magazine to a second position located below said magazine, and back to said first position; a card knife mounted on said carriage for movement between a lower position and a raised position projecting in said raised position above said spaced support members, said card knife passing between said spaced support members during movement of said carriage to and from said second position; means on said card bed engaging said card knife during movement of said carriage toward said second position for raising said card knife from said lower position to said raised position so that said card knife engages the edge of the lowermost card from said stack during movement to said second position; gripping means for gripping the thus displaced card; spring means urging said gripping means into a gripping position; a stationary stop on said card bed engaging said gripping means during movement of said carriage to said second position and actuating said gripping means to move to an open position against the action of said spring means for receiving the opposite edge of the displaced card, said stop means releasing said gripping means during movement of said carriage from said second position toward said first position so that said gripping means move to said gripping position and grip said displaced lowermost card; means for moving said card knife back to said lower position during movement of said carriage from said second position to said first position; and means for moving said carriage from said first position to said second position and again back to said first position whereby the card gripped by said gripping means moves with said carriage to said first position.

5. In a machine of the type described, in combination, a magazine for holding a stack of record cards; a card bed; a card carriage movable along said card bed from a first position spaced from said magazine to a second position located underneath said magazine, and back to said first position; card positioning means mounted on said carriage for movement therewith and including a card knife for engaging the edge of the lowermost card of the stack of cards during movement of said carriage from said first position to said second position to displace said lowermost card from said stack, and gripping means for gripping the opposite edge of the thus displaced lowermost card; and means for moving said carriage from said first position to said second position and again back to said first position and including resilient means tensioned during movement of said carriage from said first position to said second position and returning said carriage from said second position to said first position whereby the card gripped by said gripping means moves with said carriage to said first position.

References Cited in the file of this patent

UNITED STATES PATENTS

| | | |
|---|---|---|
| 2,093,555 | Ford | Sept. 21, 1937 |
| 2,290,827 | Thomas | July 21, 1942 |
| 2,566,931 | Cunningham et al. | Sept. 4, 1951 |
| 2,675,231 | Doty | Apr. 13, 1954 |